United States Patent
Da Silva et al.

(10) Patent No.: US 12,452,738 B2
(45) Date of Patent: Oct. 21, 2025

(54) METHODS AND DEVICES FOR ENABLING CELL SELECTION OR CELL RESELECTION PROCEDURES

(71) Applicant: Telefonaktiebolaget LM Ericsson (publ), Stockholm (SE)

(72) Inventors: Icaro Leonardo Da Silva, Solna (SE); Tahmineh Torabian Esfahani, Sollentuna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 510 days.

(21) Appl. No.: 17/907,904

(22) PCT Filed: Mar. 13, 2020

(86) PCT No.: PCT/SE2020/050268
§ 371 (c)(1),
(2) Date: Aug. 29, 2022

(87) PCT Pub. No.: WO2021/183016
PCT Pub. Date: Sep. 16, 2021

(65) Prior Publication Data
US 2023/0107443 A1  Apr. 6, 2023

(51) Int. Cl.
*H04W 36/00* (2009.01)
*H04W 48/20* (2009.01)

(52) U.S. Cl.
CPC ... *H04W 36/0007* (2018.08); *H04W 36/0061* (2013.01); *H04W 48/20* (2013.01)

(58) Field of Classification Search
CPC ......... H04W 36/0007; H04W 36/0061; H04W 48/12; H04W 48/02
See application file for complete search history.

(56) References Cited

U.S. PATENT DOCUMENTS

2011/0177820 A1   7/2011   Westroos et al.
2012/0127957 A1   5/2012   Koskinen et al.
(Continued)

FOREIGN PATENT DOCUMENTS

CN   102754484 A   10/2012
CN   110572838 A   12/2019
(Continued)

OTHER PUBLICATIONS

International Search Report and Written Opinion dated Nov. 24, 2020 for International Application No. PCT/SE2020/050268 filed Mar. 13, 2020; consisting of 13 pages.
(Continued)

*Primary Examiner* — Zhensheng Zhang
(74) *Attorney, Agent, or Firm* — Weisberg I.P. Law, P.A.

(57) ABSTRACT

A method for operating a User Equipment, UE, in a wireless communication network. The method includes acquiring broadcast information comprising redirection information and performing a cell selection or cell reselection procedure based on the acquired broadcasted information. A corresponding UE and a computer program are also disclosed. There is also disclosed a method for operating a network node serving a User Equipment, UE, in a wireless communication network. The method includes broadcasting information having redirection information enabling the UEs to perform a cell selection or cell reselection procedure. A corresponding network node and computer program are also disclosed.

15 Claims, 6 Drawing Sheets

(56) References Cited

U.S. PATENT DOCUMENTS

2017/0006447 A1  1/2017  Bahta et al.
2018/0220344 A1  8/2018  Shaheen

FOREIGN PATENT DOCUMENTS

| CN | 112514421 B | * | 3/2022 |
| WO | 2010133750 A1 | | 11/2010 |
| WO | 2011100707 A1 | | 8/2011 |
| WO | 2019194648 A1 | | 10/2019 |
| WO | 2020027520 A1 | | 2/2020 |

OTHER PUBLICATIONS

Chinese Office Action and English Summary Translation dated Oct. 26, 2024 for Application No. 202080098395.7, consisting of 13 pages.

3GPP TSG-RAN2 Meeting #102 R2-1807362; Title: Stage 3 RRC TP on RRC_Inactive state for E-UTRA connected to 5GC; Source to WG: Intel; Source to TSG: R2; Work item code: LTE_5GCN_connect-Core; Category: B; Release: Rel-15; Date and Location: Busan, Korea, May 21-25, 2018; consisting of 63 pages.

International Search Report and Written Opinion dated Jul. 7, 2021 for International Application No. PCT/SE2021/050293 filed Mar. 31, 2021; consisting of 8 pages.

3GPP TSG-RAN meeting #86 RP-192599; Title: Second round email discussion for R17 proposals on slicing; Agenda item: 9.1.2; Source: CMCC; Document for: Discussion and Decision; Date and Location: Dec. 9-12, 2019, Sitges, Barcelona; consisting of 34 pages.

* cited by examiner

METHODS AND DEVICES FOR ENABLING CELL SELECTION OR CELL RESELECTION PROCEDURES

CROSS-REFERENCE TO RELATED APPLICATION

This application is a Submission Under 35 U.S.C. § 371 for U.S. National Stage Patent Application of International Application Number: PCT/SE2020/050268, filed Mar. 13, 2020 entitled "METHODS AND DEVICES FOR ENABLING CELL SELECTION OR CELL RESELECTION PROCEDURES," the entirety of which is incorporated herein by reference.

TECHNICAL FIELD

The proposed technology generally relates to User Equipments and network nodes in a wireless communication network and to methods performed by them. More specifically it relates to methods and devices that enables a cell selection procedure or cell reselection procedure with reduced signaling demands.

BACKGROUND

Release with redirect and resume with redirect are two procedures in Long Term Evolution, LTE, networks and in New Radio, NR, in which a cell may release an active mode User Equipment, UE, or deny service to a UE that is accessing the cell, and instead direct the UE to another cell or frequency in order for it to establish a new connection. Information relating to release with redirect and resume with redirect are sent from the network, e.g., from a network node, to the UE in a unicast message. This unicast message provides specific details, i.e., system information, regarding the cell the UE should access and/or relevant frequencies to use by the UE. In Long Term Evolution, LTE, New Radio, NR, and other mobile networks, such system information is transmitted in MIB, Master Information Block, and different SIBs, System Information Blocks. The MIB includes a limited number of the most essential and most frequently transmitted parameters that are needed in order to acquire additional information from the cell. UEs in idle mode read the system information comprised in the MIB and SIBs in order to know how to move between different cells, i.e. how to perform a cell selection or cell reselection procedure. The parameters that the UE reads are related to e.g. identities of networks and cells, cell barring, signal level thresholds, quality level thresholds, frequency channels and priorities. Specific information about the general procedures is given in the APPENDIX.

This general procedure is however prone to some drawbacks. It requires in particular substantial signaling between network nodes and UEs. That is to say, the UE needs to first perform a random-access procedure followed by sending either an RRC Resume Request or an RRC Setup Request message, and in addition to this wait for an RRC Release with redirect information. All such signalling may be subject of signalling delay which in turn may lead to UEs being kept unnecessarily long at a cell. The proposed technology aims to at least alleviate some of the problems associated with cell selection or cell reselection procedures.

SUMMARY

It is a general object to provide mechanisms that enables an efficient cell selection or cell reselection procedure in a wireless communication network.

It is a particular object to provide a method for operating a User Equipment, UE, that enables an efficient cell selection or cell reselection procedure in a cellular wireless communication network.

It is another object to provide a User Equipment, UE, that utilizes a method for operating a User Equipment, UE, that enables an efficient cell selection or cell reselection procedure in a cellular wireless communication network.

It is still another object to provide a method for operating a network node that enables a User Equipment, UE, to perform an efficient cell selection or cell reselection procedure in a cellular wireless communication network.

It is yet another object to provide a network node that utilizes a method that enables a User Equipment, UE, to perform an efficient cell selection or cell reselection procedure in a cellular wireless communication network.

It is a specific object to provide computer programs for controlling a User Equipment, UE, and a network node in order to perform the methods disclosed herein.

These and other objects are met by embodiments of the proposed technology.

According to a first aspect, there is provided a method for operating a User Equipment, UE, in a wireless communication network. The method comprises the steps of acquiring broadcast information comprising redirection information and performing a cell selection or cell reselection procedure based on the acquired broadcasted information.

According to a second aspect there is provided a method for operating a network node serving a User Equipment, UE, in a wireless communication network. The method comprises the step of broadcasting information comprising redirection information enabling the UEs to perform a cell selection or cell reselection procedure.

According to a third aspect there is provided a User Equipment, UE, in a wireless communication system. The UE comprises communication circuitry configured to acquire broadcasted system information and processing circuitry configured to perform a cell selection or cell reselection procedure based on the acquired broadcasted information.

According to a fourth aspect there is provided a network node serving a User Equipment, UE, in a wireless communication network. The network node comprises communication circuitry configured to broadcast information comprising redirection information enabling the UEs to perform a cell selection or cell reselection procedure.

According to a fifth aspect there is provided a computer program for controlling a User Equipment in a wireless communication network. The computer program comprising instructions, which when executed by at least one processor, cause the at least one processor to read acquired broadcasted information comprising redirection information, and initiate a cell selection or cell reselection procedure based on the read acquired broadcasted information.

According to a sixth aspect there is provided a computer program for controlling a network node serving a User Equipment, UE, in a wireless communication network. The computer program comprising instructions, which when executed by at least one processor, cause the at least one processor to initiate broadcasting of information comprising redirection information that enables the UE to perform a cell selection or cell reselection procedure.

Embodiments of the proposed technology enables a more time efficient cell selection procedure or cell reselection procedure for a User Equipment, UE. It also enables an improvement of latency.

Other advantages will be appreciated when reading the detailed description.

BRIEF DESCRIPTION OF THE DRAWINGS

The embodiments, together with further objects and advantages thereof, may best be understood by making reference to the following description taken together with the accompanying drawings, in which.

DETAILED DESCRIPTION

Throughout the drawings, the same reference designations are used for similar or corresponding elements.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Figure 1:
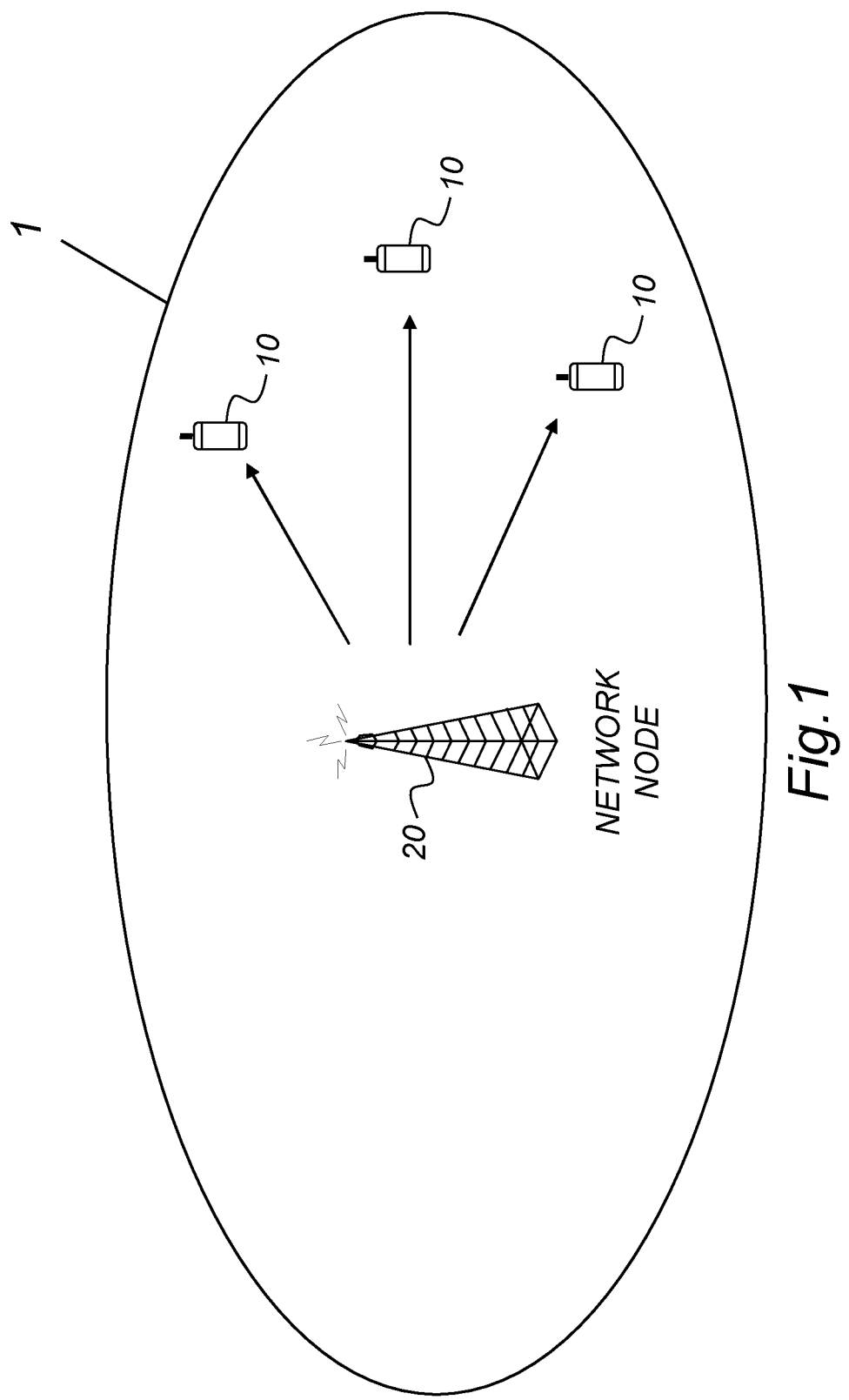
FIG. 1 is a schematic diagram illustrating a network node serving a number of User Equipments in a wireless communication network.

For a better understanding of the proposed technology, it may be useful to begin with a brief analysis of the technical problem. Consider the schematic illustration of a wireless communication network given in FIG. 1. A network node 20 serves a number of UEs 10 in a cell 1. As was mentioned in the background section in this disclosure, release with redirect and resume with redirect are two procedures in LTE and NR in which a cell may release an active mode UE 10 or deny service to a UE 10 accessing the cell, and instead direct the UE to another cell or frequency. Release with redirect and resume with redirect are sent from the network, i.e., from the network node 20, to the UE 10 in a unicast message. The unicast message is illustrated with arrows in FIG. 1. A particular problem associated with this approach is related to the signaling delay in the cell when the UE is redirected to another cell. Such signaling delay may worsen the latency and leave the UE with a poor connection for an unnecessarily long time.

The proposed technology aims to provide mechanisms that addresses at least part of the problem caused by signaling delay. The proposed way is based on the insight that redirect information can be broadcast in the cell instead of being unicast. Redirect information as used herein can generally be seen as a list of services that a particular network or network node may support. For example, voice, video etc. Redirect information such as this is sensitive to the latency and is provided/supported in specific frequencies. Redirection information may in particular contain rules for redirecting UEs.

According to the proposed technology there is provided mechanisms whereby a network node is allowed to interact with a UE in a highly efficient manner in which redirect information is broadcast by the network node and acquired by the UE in order to enable the latter to perform a well-informed decision whether to initiate a cell selection or cell reselection procedure. This overarching mechanism is based on two complementary methods, one method performed by a UE and one method performed by a network node. Below the method performed by the UE will be described. The method performed by the network node will be described in a later section.

Figure 2A:
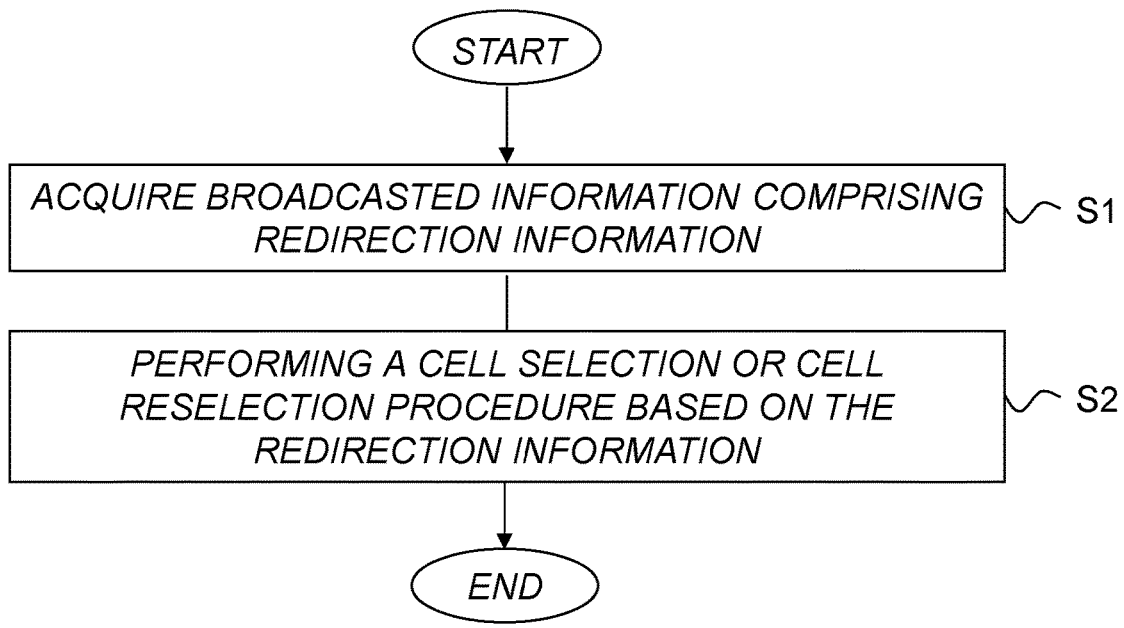
FIG. 2A is a schematic flow diagram illustrating a method for operating a User Equipment according to the proposed technology.

To this end the proposed technology provides a method for operating a User Equipment, UE, 10 in a wireless communication network. The method comprises the steps of acquiring S1 broadcast information comprising redirection information, and performing S2 a cell selection or cell reselection procedure based on the acquired broadcasted information. FIG. 2A provides a schematic flow diagram illustrating the method.

This particular method may be compared with existing procedures where, in the case a network or a network node does not support a certain service or wants one or several UEs that are camping on it to be redirected to another Radio Access Technology, RAT, or network node, e.g. during service-based load balancing, the network or network node has to wait until these UEs perform a request. This procedure will require both uplink, UL, and downlink, DL, signalling in both random access channels and over channels carrying RRC signalling, to be able to redirect the UE. This has to happen even though the network or network node already has a clear rule of redirecting UEs that request a given service when they camp on a given frequency/RAT.

The proposed technology however provides mechanisms whereby the network or network node may indicate redirect information in a broadcast message. This is very beneficial with regard to latency reduction during the upstart of a particular service and it also reduces the amount of air interface signalling between the UE and a target network node when the UE tries to establish or resume a connection. This is due to the fact that the UE already knows, due to the broadcasted information, that it needs to redirect to another RAT/cell/frequency without the need to first perform random access, something that requires at least 4 messages, followed by sending an RRC Resume Request or RRC Setup Request message, and waiting for an RRC Release with redirect information.

Some of the embodiments contemplated herein will now be described in more detail. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

According to a particular embodiment of the proposed technology there is provided a method, wherein the cell selection or cell reselection procedure is performed based on a pre-determined criterion to be fulfilled according to the redirection information. The redirection information may, as has been mentioned, contain rules stipulating how a UE should move between cells/frequencies or RATs. So when the UE has acquired the redirect information through the broadcast, the UE may be pre-configured to deduce how it should move based on the content. Specific examples of such pre-determined criterion will be given below.

According to another embodiment of the proposed technology there is provided a method wherein the step of performing S2 the cell selection or cell reselection procedure is initiated during a connection resume procedure, where the UE 10 is in an inactive state, or in a connection set up procedure, where the UE 10 is in an idle state. This embodiment enables a UE to utilize earlier acquired redirect information when initiating a connection setup procedure. It may for example obtain redirect information at a time t=0, this information may then be used at a later time, t=t* when the connection resume procedure is initiated. Since the UE may use already acquired information there will be a reduced amount of dedicated signaling during the procedure.

According to an alternative embodiment of the proposed technology there is provided a method wherein the step S2 of performing the cell selection or cell reselection procedure is initiated during a connection resume procedure and wherein the pre-determined criterion to be fulfilled comprises:
that the resume cause for a possible connection resume procedure is comprised in the redirection information; and/or
that the access category for a possible connection resume procedure is comprised in the redirection information.

This is an alternative version to the one related to the connection setup procedure above. By determining that the redirection information comprises the resume cause and/or the access category the UE may initiate a cell selection or cell reselection procedure with a reduced amount of dedicated signaling.

According to still another embodiment of the proposed technology there is provided a method wherein the acquired broadcasted information further comprises a mapping between the resume cause and/or the access category and at least one of the following: a redirection to a target Radio Access Technology, target RAT, a redirection to a target serving cell, and a redirection to a target frequency. Such a mapping may be beneficially used by the UE in order to find a suitable new connection.

By way of example, the proposed technology provides a method wherein the step S2 of performing the cell selection or cell reselection procedure is initiated during a connection setup procedure and wherein the pre-determined criterion to be fulfilled comprises:
that the establishment cause for a possible connection setup procedure is comprised in the redirection information, and/or
that the access category for a possible connection setup procedure is comprised in the redirection information.

This particular embodiment handles scenarios where the UE is intended to establish a connection instead of resuming a connection as described earlier. The same benefits are achieved in this case, e.g., a reduced amount of dedicated signaling.

An optional embodiment of the proposed technology provides a method wherein the acquired broadcasted information further comprises a mapping between the establishment cause and/or the access category and at least one of the following:
a redirection to a target Radio Access Technology, target RAT
a redirection to a target serving cell
and
a redirection to a target frequency.

Above we have described various versions of the redirect information content that will enable the UE to efficiently select or reselect a cell. The redirect information is acquired from a broadcast from the network node. There are several specific ways for incorporating the redirect information in the broadcast. According to one possible embodiment of the proposed technology there is provided a method wherein the redirection information is comprised in a broadcasted System Information Block, SIB.

A particular version of the above embodiment provides a method wherein the redirection information is comprised in an information element added to an existing SIB.

Figure 2B:
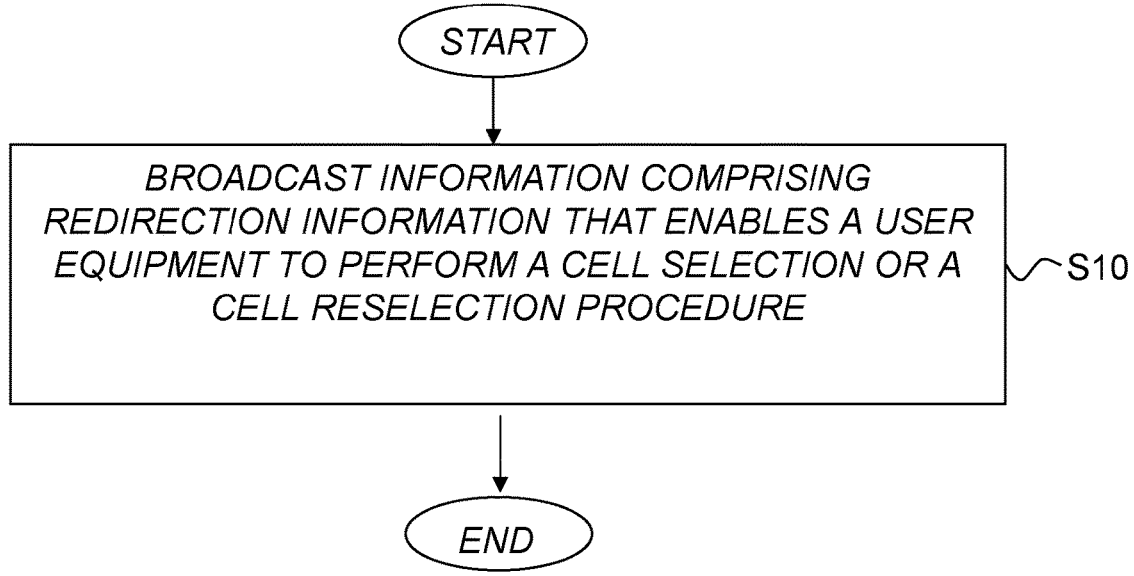
FIG. 2B is a is a schematic flow diagram illustrating a method for operating a network node according to the proposed technology.

According to another aspect of the proposed technology there is also provided, as was mentioned earlier, a complementary method performed by a network node. This complementary method will enable a User Equipment to perform a time efficient cell reselection or cell selection procedure by broadcasting relevant redirection information that can be used by the UE to base the earlier described cell selection or cell reselection procedure. To this end there is provided a method for operating a network node 20 serving a User Equipment, UE, 10 in a wireless communication network. The method comprises the step of broadcasting S10 information comprising redirection information enabling the UEs to perform a cell selection or cell reselection procedure. The method is schematically illustrated by the flow diagram in FIG. 2B.

Some of the embodiments related to the network operating method will now be described in more detail. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

A particular embodiment of the proposed network operating method provides a method wherein the redirection information comprises at least one of the following:
a resume cause for a possible connection resume procedure for the UE 10,
an access category for a possible connection resume procedure for the UE 10.
an establishment cause for a possible connection setup procedure for the UE 10; and
an access category for a possible connection setup procedure for the UE 10.

The providing of information of this nature enables the UE to efficiently control either a connection resume procedure or a connection setup procedure. This will in turn ensure a reduced amount of signaling and also avoids any signaling delay associated therewith.

Yet another embodiment of the proposed technology provides a network operating method, wherein the redirection information further comprises a mapping between the resume cause, the establishment cause and/or the access categories and at least one of the following:
- a redirection to a target Radio Access Technology, target RAT
- a redirection to a target serving cell and
- a redirection to a target frequency.

The network node may also utilize different modes for transmitting the redirection information. Below there is described several possibilities, though none of the proposed modes are essential.

An optional embodiment of the proposed network operating method provides a method wherein the step S10 of broadcasting information comprises to broadcast a System Information Block, SIB, comprising the redirection information.

According to this transmission mode the broadcasted message may be provided by means of a system information block, e.g. SIB2, SIB4 or SIB5. Since the information in certain scenarios may be sensitive from a pure security perspective, it would be possible to encrypt the SIB so that it can be decrypted by an Inactive/Idle UE and by the node responsible for broadcasting the message. By way of example, it is also possible to transmit the redirection information sequentially in the shape of SIB2, SIB4 and SIB5 corresponding to serving, inter-frequency and inter-RAT frequencies according to the following:

In SIB2 when it is only relevant for serving frequency cell reselection, i.e. by providing information about serving frequency in the serving cell for cell reselection. This information may be mapped to the serving frequency in a Cell Reselection Priority list.

In SIB4 when it is only relevant only inter-frequency cell-reselection i.e. by providing information about other frequency neighboring cells in the same RAT for cell re-selection. This information may be mapped one-to-one to the corresponding frequency in a Cell Reselection Priority list.

In SIB5 when it is only relevant for inter-RAT frequency cell-reselection i.e. by providing information about other RAT frequency neighboring cells for cell re-selection. This information may be mapped one-to-one to the corresponding frequency in a Cell Reselection Priority list.

A particular version of the above embodiment provides a method wherein the redirection information is comprised in an information element, IE, added to an existing SIB. As an example, we can define an IE which can be added to an existing SIB for inter-frequency, intra-frequency and inter RAT frequency.

In addition to this version, there is also the possibility to transmit the redirection information in an aggregated message in one of the SIBs or in a new SIB defined for this purpose and dedicated thereto.

Having described some of the embodiments relating to both the method for operating a User Equipment and to the complementary method for operating a network node, below we will provide some concrete examples of how these methods may cooperate to enable an efficient cell selection or cell reselection procedure. The examples are merely provided to aid the understanding of the concepts set forth by the proposed technology and should not be construed as limiting.

Consider as a first example a scenario where a UE is camping in a cell. Assume further that a network node broadcasts redirection information that is relevant for the camping UE. The UE may now acquire the broadcasted redirect information, for example by receiving and decoding a SIB. Based on the content of the redirect information that UE may determine whether to access or attempt to resume the connection in the cell the UE is camping in or whether to access another cell, optionally at another other frequency. The particular decision to make regarding this will be based on whether the acquired information actually comprised redirection information.

As another example consider again a wireless communication network in which a UE is served by a network node in a cell. The proposed technology may now be used to enable a swift redirection of a UE to another cell/frequency and/or RAT. To achieve this the network node broadcasts redirection information associated with such frequency and/or RAT. The UE in turn acquires, from the broadcasted message, e.g. in system information, the redirection information. The redirection information may for example be used in the following scenarios:

i) If the UE obtain a request from the Access Stratum, AS, or an upper layer to initiate a resume/setup procedure. The UE should determine whether the acquired broadcasted message, e.g. system information, in the cell the UE is camping contains relevant redirection information.

ii) If the acquired broadcasted message, e.g. system information block, contains redirection information, the UE performs cell selection according to the indicated target frequency and/or target RAT that is configured in the redirected information.

iii) If the acquired broadcasted message, e.g. system information block, does not contain a redirection information the UE may continue the setup and resume procedure, i.e. in the cell/frequency/RAT it is currently camping on.

Figure 3:
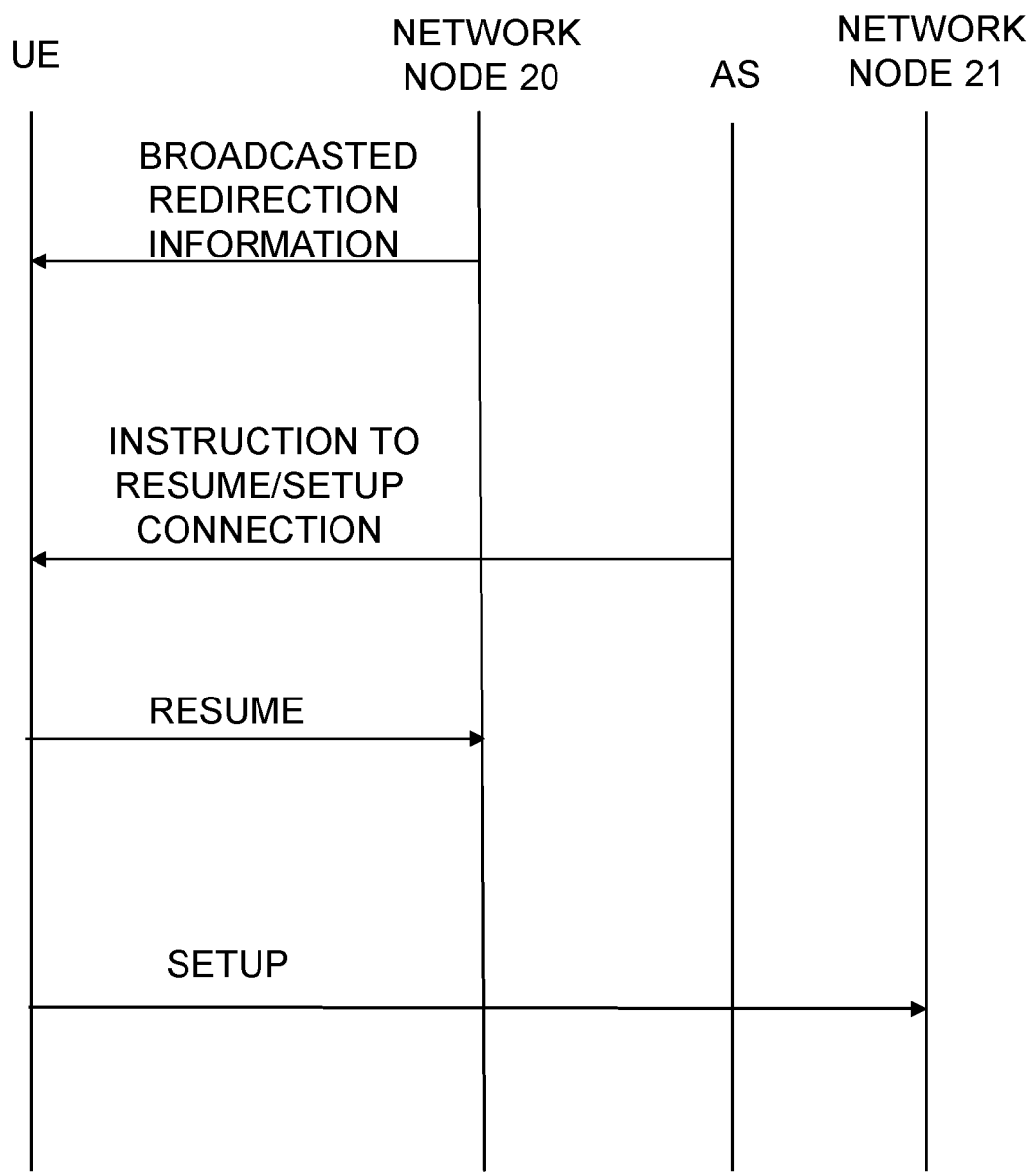
FIG. 3 is a schematic signaling diagram illustrating how a UE may interact with network nodes and Access Stratums according to the proposed technology

FIG. 3 is a schematic signalling diagram illustrating a possible scenario for the proposed technology. A network node 20 broadcasts redirection information that is acquired by the UE. At a later stage the UE gets instructions from e.g., the Access Stratum, AS, to initiate a resume/setup connection procedure. The UE may initiate a cell selection or cell reselection procedure based on the redirect information provided in the broadcast message, e.g., in the shape of a target frequency or a target RAT. It may for example utilize the information to resume a connection with network node 20 but it could also be steered to setup a new connection with another network node 21, spanning a different cell. It is also possible for the UE to resume to network node 21 if the network node 21 is within its RAN Notification Area, RNA, by utilizing the proposed mechanisms. It may in particular be used to control a UE to select a network node to resume to within those that are present in RNA. The UE may for example be configured to check the network nodes within its RNA and determine a suitable network node from these based on the acquired redirect information. RNA is the area in which the UE is allowed to move without notifying the network. An inactive UE performs a location-update procedure when it moves to e.g., a cell that is not part of its RNA list. The RNA list is generally provided to the UE in a RRCRelease/SuspendConfig message.

According to the proposed technology the redirection information may comprise information that may be relevant for, and dependent on, several distinct possible scenarios. As a first example it is considered a resume case for when a UE is in an inactive state. For such a scenario the relevant redirection information may comprise at least one of the following mappings:
- a mapping between the resume cause and a target frequency and possibly a RAT to which the UE is redirected upon getting a request from upper layers or AS to resume a connection with that resume cause a mapping between resume cause and a target cell in a given RAT and frequency where the UE is redirected upon getting a request from upper layers or AS to resume a connection with that resume cause a mapping between resume cause and a target RAT to be redirected where the UE is redirected upon getting a request from upper layers or AS to resume a connection with that resume cause.

Hence a network node may be provided with such mappings

The relevant redirection information may in the case of a setup for a UE in an inactive state instead comprise at least one of the following mappings:

a mapping between establishment cause and a target frequency and RAT where the UE is redirected upon getting a request from upper layers or AS to establish a connection with based on the specific establishment cause a mapping between establishment cause and a target cell in a given RAT and frequency to which the UE is redirected upon getting a request from upper layers or AS to establish a connection with based on the specific establishment cause a mapping between establishment cause and a target RAT to which the UE is redirected when it gets a request from upper layers or AS to establish a connection based on the specific establishment cause.

Hence a network node may be provided with, or generate, such mappings and broadcast them in the form of redirection information. The redirection information is then acquired, e.g., received and decoded, by the relevant UE. The UE may then utilize the obtained information as a basis for initiating a cell selection and cell reselection procedure.

The network node may also utilize different modes for transmitting the redirection information. Below there is described several possibilities, though none of the proposed modes are essential.

According to a first transmission mode the broadcasted message may be provided by means of a system information block, e.g. SIB2, SIB4 or SIB5. Since the information in certain scenarios may be sensitive from a pure security perspective, one possible mode would be to encrypt that the SIB should be using a security key that may be a public key that can be computed by an Inactive/Idle UE and by the node responsible for broadcasting the message.

In another optional version, the redirection information could be transmitted in an aggregated message in one of the SIBs as either a new information element, IE, or in a new SIB defined for this purpose and dedicated thereto.

Having described the alternative methods disclosed herein in some detail, in the following we describe devices that can utilize the proposed methods. All mentioned advantages associated with the corresponding methods are equally valid for the devices to be described and they will not be repeated.

According to a particular aspect of the proposed technology there is provided a User Equipment, UE, 10 configured to work in a wireless communication system. The UE comprises communication circuitry 100 configured to acquire broadcast system information comprising redirect information. The UE also comprises processing circuitry 110 configured to perform a cell selection or cell reselection procedure based on the acquired broadcasted information.

As used herein, the non-limiting term "User Equipment (UE)" may refer to a mobile phone, a cellular phone, a Personal Digital Assistant (PDA), equipped with radio communication capabilities, a smart phone, a laptop or Personal Computer (PC), equipped with an internal or external mobile broadband modem, a tablet with radio communication capabilities, a target device, a Machine-to-Machine (M2M) device, a Machine Type Communication (MTC) device, an Internet of Thing (IoT) device, a Device-to-Device (D2D) UE, a machine type UE or UE capable of machine to machine communication, Customer Premises Equipment (CPE), Laptop Embedded Equipment (LEE), Laptop Mounted Equipment (LME), USB dongle, a portable electronic radio communication device, and/or a sensor device, meter, vehicle, household appliance, medical appliance, camera, television, radio, lightning arrangement and so forth equipped with radio communication capabilities or the like. The term UE should in particular be interpreted as non-limiting terms comprising any type of wireless device communicating with a network node in a wireless communication system and/or possibly communicating directly with another wireless communication device. In other words, a wireless communication device may be any device equipped with circuitry for wireless communication according to any relevant standard for communication.

According to a particular embodiment of the proposed technology there is provided a User Equipment, UE, 10 wherein the processing circuitry 110 is configured to perform the cell selection or cell reselection procedure based on a pre-determined criterion to be fulfilled by the redirection information.

According to another embodiment of the proposed technology there is provided a User Equipment, UE, 10 wherein the processing circuitry 110 is configured to initiate the cell selection or cell reselection procedure during a connection resume procedure, where the UE 10 is in an inactive state, or in a connection set up procedure, where the UE 10 is in an idle state.

According to yet another embodiment of the proposed technology there is provided a User Equipment, UE, 10 wherein the processing circuitry 110 is configured to initiate the cell selection or cell reselection procedure during a connection resume procedure and configured to perform the cell selection or cell reselection procedure:

if the resume cause for a possible connection resume procedure is comprised in the redirection information; and/or if the access category for a possible connection resume procedure is comprised in the redirection information.

According to still another embodiment of the proposed technology there is provided a User Equipment, UE, 10 wherein the communication circuitry 100 is configured to acquire broadcasted information that further comprises a mapping between the resume cause and/or the access category and at least one of the following:

a redirection to a target Radio Access Technology, target RAT;

a redirection to a target serving cell; and a redirection to a target frequency.

By way of example, the proposed technology provides a User Equipment, UE, 10 wherein the processing circuitry 110 is configured to initiate the cell selection or cell reselection procedure during a connection setup procedure and configured to perform the cell selection or cell reselection procedure:

if the establishment cause for a possible connection setup procedure is comprised in the redirection information; and/or if the access category for a possible connection setup procedure is comprised in the redirection information.

An optional embodiment of the proposed technology provides a User Equipment, UE, 10 wherein the communication circuitry 100 is configured to acquire broadcasted information that further comprises a mapping between the establishment cause and/or the access category and at least one of the following:

a redirection to a target Radio Access Technology, target RAT;

a redirection to a target serving cell; and a redirection to a target frequency.

A particular embodiment of the proposed technology provides a User Equipment, UE, 10 according wherein the communication circuitry 110 is configured to acquire redirection information comprised in a broadcasted System Information Block, SIB.

A specific version of the above embodiment provides a User Equipment, UE, 10 wherein the redirection information is comprised in an information element added to an existing SIB.

According to another aspect of the proposed technology there is provided a network node 20 configured to serve a User Equipment, UE, 10 in a wireless communication network. The network node comprises communication circuitry 200 configured to broadcast information comprising redirection information enabling the UEs to perform a cell selection or cell reselection procedure.

As used herein, the non-limiting term "network node" may refer to base stations, access points, network control nodes such as network controllers, radio network controllers, base station controllers, access controllers, and the like. In particular, the term "base station" may encompass different types of radio base stations including standardized base station functions such as Node Bs, or evolved Node Bs (eNBs), gNodeBs, and also macro/micro/pico radio base stations, home base stations, also known as femto base stations, relay nodes, repeaters, radio access points, Base Transceiver Stations (BTSs), and even radio control nodes controlling one or more Remote Radio Units (RRUs), or the like.

A particular embodiment of the proposed technology provides a network node 20 wherein the redirection information comprises at least one of the following:

a resume cause for a possible connection resume procedure for the UE 10 an access category for a possible connection resume procedure for the UE 10 an establishment cause for a possible connection setup procedure for the UE 10, and an access category for a possible connection setup procedure for the UE 10.

Another particular embodiment of the proposed technology provides a network node 20, wherein the redirection information further comprises a mapping between the resume cause, the establishment cause and/or the access categories and at least one of the following:

a redirection to a target Radio Access Technology, target RAT a redirection to a target serving cell, and a redirection to a target frequency.

Yet another particular embodiment of the proposed technology provides a network node 20 wherein the communication circuitry 200 is configured to broadcast information comprising the redirection information in a System Information Block, SIB. A specific version of the above embodiment provides a network node 20 wherein the redirection information is comprised in an information element added to an existing SIB.

It will be appreciated that the methods and arrangements described herein can be implemented, combined and re-arranged in a variety of ways.

For example, embodiments may be implemented in hardware, or in software for execution by suitable processing circuitry, or a combination thereof.

The steps, functions, procedures, modules and/or blocks described herein may be implemented in hardware using any conventional technology, such as discrete circuit or integrated circuit technology, including both general-purpose electronic circuitry and application-specific circuitry.

Alternatively at least some of the steps, functions, procedures, modules and/or blocks described herein may be implemented in software such as a computer program for execution by suitable processing circuitry such as one or more processors or processing units.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

Figure 4:
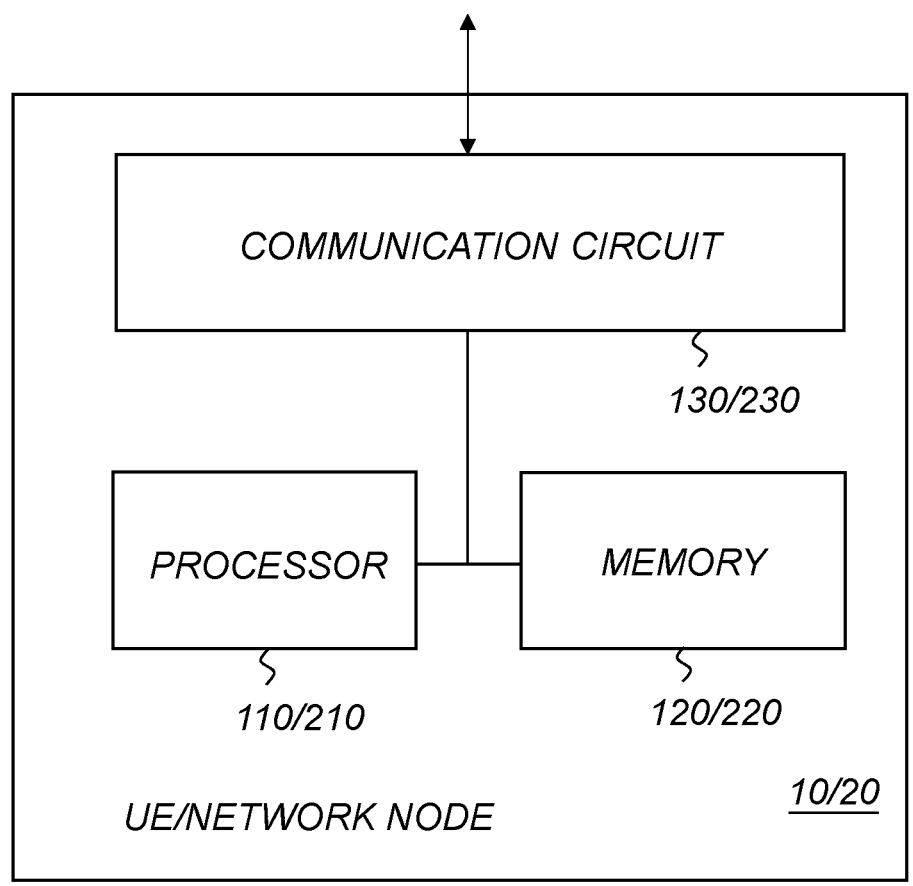
FIG. 4 is a schematic block diagram illustrating a particular embodiment of a UE according to the proposed technology

FIG. 4 is a schematic block diagram illustrating an example of a UE/network node 10; 20, based on a processor-memory implementation according to an embodiment. In this particular example, the UE/network node 10; 20 comprises a processor 110; 210 and a memory 120; 220, the memory 120; 200 comprising instructions executable by the processor 110; 210, whereby the processor is operative to control the UE/network node 10; 20. The UE/network node 10; 20 also include a communication circuit 130; 230. The communication circuit 130; 230 may include functions for wired and/or wireless communication with other devices and/or network nodes in the network. In a particular example, the communication circuit 130; 230 may be based on radio circuitry for communication with one or more other nodes, including transmitting and/or receiving information. The communication circuit 130; 230 may be interconnected to the processor 110; 210 and/or memory 120; 220. The communication circuit 130; 230 may be interconnected to the hardware circuitry and/or REG/MEM. By way of example, the communication circuit 130; 230 may include any of the following: a receiver, a transmitter, a transceiver, input/output (I/O) circuitry, input port(s) and/or output port(s).

Figure 5:
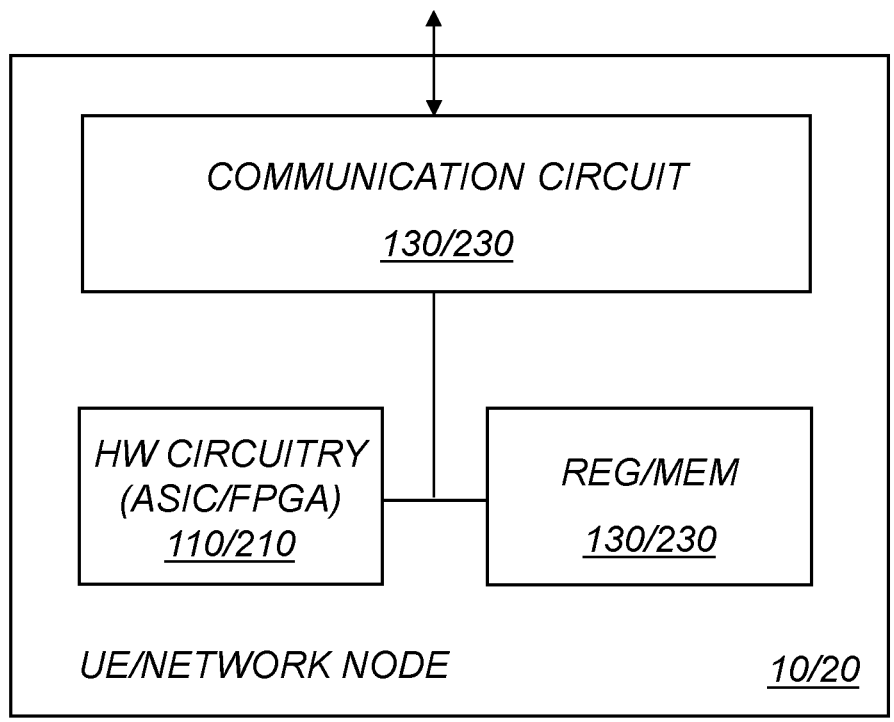
FIG. 5 is a is a schematic block diagram illustrating a particular embodiment of a network node according to the proposed technology

FIG. 5 is a schematic block diagram illustrating another example of a UE/network node 10; 20, based on a hardware circuitry implementation according to an embodiment. Particular examples of suitable hardware circuitry 110; 210 include one or more suitably configured or possibly reconfigurable electronic circuitry, e.g. Application Specific Integrated Circuits (ASICs), Field Programmable Gate Arrays (FPGAs), or any other hardware logic such as circuits based on discrete logic gates and/or flip-flops interconnected to perform specialized functions in connection with suitable registers (REG) and/or memory units (MEM) 120; 220.

It is also possible to provide a solution based on a combination of hardware and software. The actual hardware-software partitioning can be decided by a system designer based on a number of factors including processing speed, cost of implementation and other requirements.

The processing circuitry including one or more processors is thus configured to perform, when executing the computer program, well-defined processing tasks such as those described herein. The processing circuitry does not have to be dedicated to only execute the above-described steps, functions, procedure and/or blocks, but may also execute other tasks.

The proposed technology also provides a computer program 125; 135 for controlling a User Equipment in a wireless communication network. The computer program comprises instructions, which when executed by at least one processor, cause the at least one processor to read acquired broadcasted information comprising redirection information and initiate a cell selection or cell reselection procedure based on the read acquired broadcasted information.

Also provided by the proposed technology is a computer program product comprising a computer-readable medium 330 in which a computer program 125; 135 of the above aspect is carried or stored.

The proposed technology provides in addition a computer program 225; 235 for controlling a network node 20 serving a User Equipment, UE, 10 in a wireless communication network. The computer program comprises instructions, which when executed by at least one processor, cause the at least one processor to initiate broadcasting of information comprising redirection information that enables the UE to perform a cell selection or cell reselection procedure.

Also provided by the proposed technology is a computer program product comprising a computer-readable medium 330 in which a computer program 225; 235 of the above aspect is carried or stored.

By way of example, the software or computer programs described above may be realized as a computer program product 330, which is normally carried or stored on a computer-readable medium, in particular a non-volatile medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Blu-ray disc, a Universal Serial Bus (USB) memory, a Hard Disk Drive (HDD) storage device, a flash memory, a magnetic tape, or any other conventional memory device. The computer program may thus be loaded into the operating memory of a computer or equivalent processing device for execution by the processing circuitry thereof.

The proposed technology also provides a carrier comprising any of the computer programs as described above, wherein the carrier is one of an electronic signal, an optical signal, an electromagnetic signal, a magnetic signal, an electric signal, a radio signal, a microwave signal, or a computer-readable storage medium.

Figure 6:
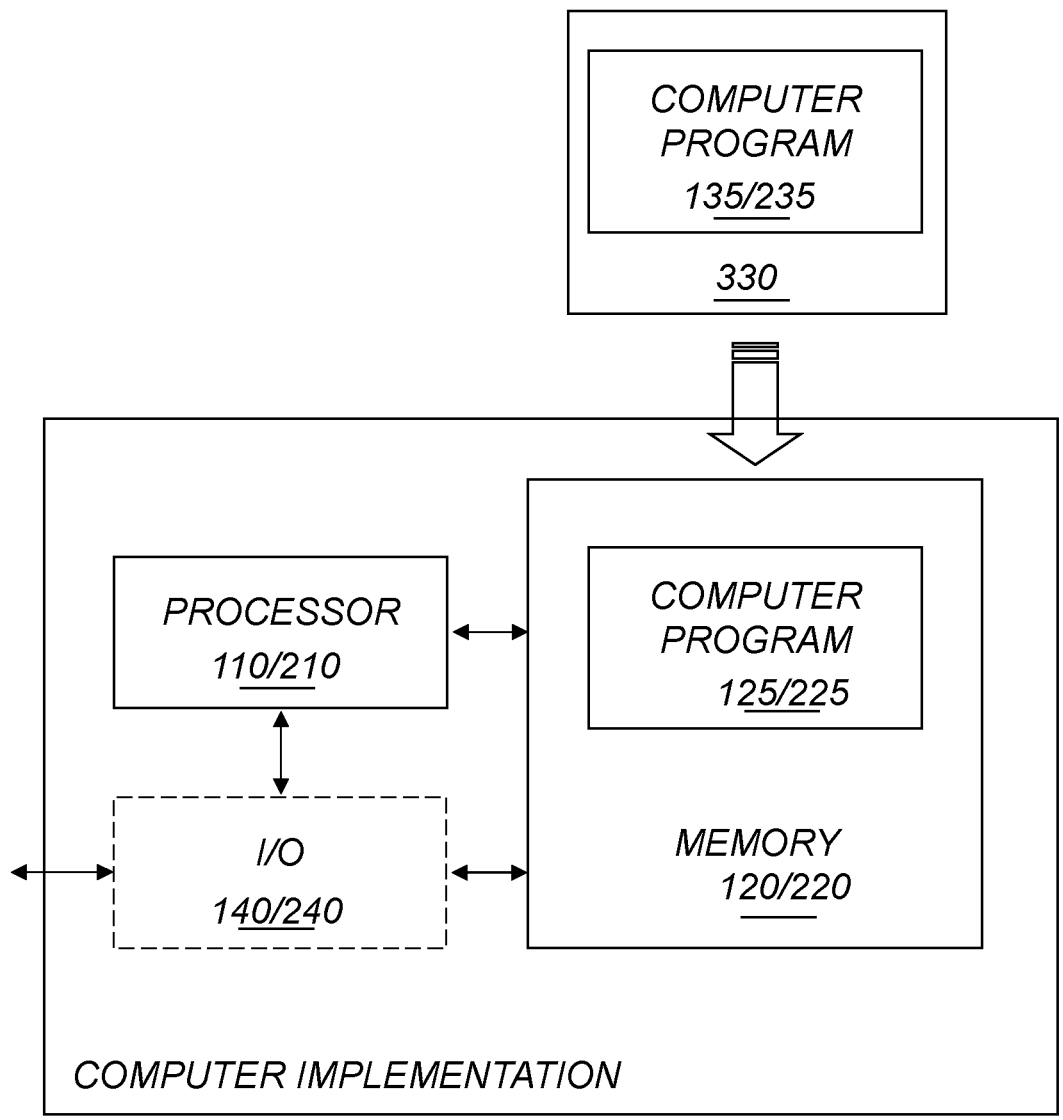
FIG. 6 is a schematic diagram illustrating a computer program implementation according to the proposed technology.

FIG. 6 is a schematic diagram illustrating an example of a computer-implementation according to an embodiment. In this particular example, at least some of the steps, functions, procedures, modules and/or blocks described herein are implemented in a computer program 125; 135; 225; 235, which is loaded into the memory 120; 220 for execution by processing circuitry including one or more processors 110; 210. The processor(s) 110; 210 and memory 120; 200 are interconnected to each other to enable normal software execution. An optional input/output device 140; 240 may also be interconnected to the processor(s) 110; 210 and/or the memory 120; 200 to enable input and/or output of relevant data such as input parameter(s) and/or resulting output parameter(s).

The term 'processor' should be interpreted in a general sense as any system or device capable of executing program code or computer program instructions to perform a particular processing, determining or computing task.

The processing circuitry including one or more processors is thus configured to perform, when executing the computer program, well-defined processing tasks such as those described herein. The processing circuitry does not have to be dedicated to only execute the above-described steps, functions, procedure and/or blocks, but may also execute other tasks.

APPENDIX

In this appendix we provide some information about the general procedures during cell redirection of UEs. Additional information may be found in the technical specification's TS 38.331 3GPP, Section 5.2.4.2, and TS 38.304, Section 5.2 3GPP.

The cell redirection is, as was mentioned in the background, often controlled by MIBs and SIBs by utilizing certain parameters. Specific SIBs and parameters depend upon the relevant RAT. We describe this in what follows.

In NR the threshold parameters are available in the different SIBs as follows:

SIB1 contains information whether the UE can access a cell and scheduling information for other SIBs plus RRC configuration information common for all UEs. The threshold parameters in SIB1 are thus related to the serving cell, and specifies the conditions under which a UE is allowed to camp on it. Some relevant parameters are:

q-RxLevMin which is a parameter that specifies the minimum required signal level, referred to as RSRP, in the cell.

q-RxLevMinOffset specifies the offset related to q-RxLevMin, that is to say, to the RSRP threshold. This parameter is optional but is often used to enable better cell selection decisions.

q-QualMin is a parameter that specifies the minimum required quality level, referred to as RSRQ, in the cell.

q-QualMinOffset is the offset related to q-QualMin.

connEstFailOffset is used to configure parameters for connection establishment failure control. In what follows below, it is referred to as Qoffsettemp.

The particular system information block referred to as SIB2 contains cell re-selection information that is common for intra-frequency, inter-frequency and/or inter-RAT cell re-selection. Some relevant parameters with the usually used terminology are as follows:

q-Hyst: the signal level for neighboring cells is decreased with the hysteresis value in order to avoid ping-pong. That is, to avoid sending a UE back and forth between serving cells.

s-NonIntraSearchP is the threshold Srxlev value for serving cell, and it is used to determine whether UE should search for new cell or not.

s-NonIntraSearchQ is the threshold Squal value for serving cell, and it is used to determine whether UE should search for new cell or not.

q-RxLevMin is the minimum signal level for neighbor cell.

q-QualMin specifies the minimum required quality level in the cell in dB for intra-frequency neighbor cells.

s-IntraSearchP indicates an receiver level threshold, Rx level threshold. The UE only performs intra-frequency measurement when SrxLev of the serving cell is smaller or equal to s-IntraSearchP.

s-IntraSearchQ indicates a Qual level threshold. The UE only performs intra-frequency measurement when Squal of the serving cell is smaller or equal to s-IntraSearchQ.

t-ReselectionNR is the time the threshold condition needs to be fulfilled before a reselection can be done.

p-Max is the maximal power from a UE and is used to calculate Pcompensation used below.

threshServingLowP is the Srlev threshold, given in decibel, dB, that is used by the UE on the serving cell when reselecting towards a lower priority RAT/frequency.

threshServingLowQ is the Squal threshold used by the UE on the serving cell when reselecting towards a lower priority RAT/frequency.

The particular system information block referred to as SIB3 contains information that is only relevant for intra-frequency cell-reselection. Relevant threshold parameters with the usually used terminology are as follows:

intraFreqNeighCellList, a list of intra-frequency neighbouring cells with specific cell reselection parameters given by:

physCellId which denotes the Physical Cell Id of the neighbour cell q-OffsetCell denotes the specific Rx offset between the serving cell and the neighbor cell.

q-RxLevMinOffsetCell denotes the cell specific Rx level offset in dB to Qrxlevmin q-QualMinOffsetCell denotes the cell specific quality level offset in dB to Qqualmin The particular system information block referred to as SIB4 contains information that is only relevant for inter-frequency cell re-selection. This means that each set of parameters are available for each neighbor frequency band. Relevant threshold parameters are:

q-RxLevMin which denotes the minimum signal level for the neighbor cell.

q-QualMin denotes the minimum quality level for the neighbor cell.

p-Max is the maximal power from a UE and is used to calculate Pcompensation used below.

t-ReselectionNR denotes the time interval that evaluate the re-selection criteria before the reselection can be done.

qOffsetFreq denotes offset for equal priority NR frequencies.

q-RxLevMinOffsetCell denotes the cell specific Rx level offset in dB to q-RxLevMin threshX-HighP denotes the Srxlev threshold, in dB, used by the UE when reselecting towards a higher priority frequency than the current serving frequency. Each frequency of NR might have a specific threshold.

threshX-LowP denotes the Srxlev threshold (in dB) used by the UE when reselecting towards a lower priority frequency than the current serving frequency. Each frequency of NR might have a specific threshold.

The particular system information block referred to as SIB5 contains information that is only relevant for inter-RAT cell re-selection information about E-UTRA frequencies and neighboring cells. The threshold levels in SIB5 are unique for each E-UTRA frequency. The relevant parameters are:

t-ReselectionEUTRA q-RxLevMin q-QualMin p-MaxEUTRA is the maximal power from a UE and is used to calculate Pcompensation used in section below.

q-RxLevMinOffsetCell denotes the cell specific Rx level offset in dB to q-RxLevMin threshX-HighP denotes the Srxlev threshold, in dB, that is used by the UE when reselecting towards a higher priority RAT than the current serving frequency. Each frequency of E-UTRAN might have a specific threshold.

threshX-LowP denotes the Srxlev threshold, in dB, that is used by the UE when reselecting towards a lower priority RAT than the current serving frequency. Each frequency of E-UTRAN might have a specific threshold.

In LTE the equivalent parameters are arranged in SIBs in a similar way. In this scenario the parameters in SIB1, SIB3, SIB5 and SIB24 are of interest.

SIB1 contains information relevant when evaluating if a UE is allowed to access a cell and defines the scheduling of other system information, i.e. it contains the equivalent threshold parameters as SIB1 in NR. Relevant threshold parameters are q-RxLevMin q-RxLevMinOffset p-Max q-QualMin-r9 q-QualMinOffset-r9

SIB3 in turn contains cell re-selection information common for intra-frequency, inter-frequency and/or inter-RAT cell re-selection, i.e. applicable for more than one type of cell re-selection but not necessarily all, as well as intra-frequency cell re-selection information other than neighbouring cell related, i.e. it contains the equivalent threshold parameters as SIB2 in NR. Relevant threshold parameters are q-Hyst s-NonIntraSearch/s-NonIntraSearchP-r9 s-NonIntraSearchQ-r9 q-RxLevMin q-QualMin-r9 s-IntraSearch/s-IntraSerachP-r9 s-IntraSearchQ-r9 t-ReselectionEUTRA p-Max threshServingLow

The particular system information block referred to as SIB5 contains information that is only relevant for inter-frequency cell re-selection. That is to say, to information about other E UTRA frequencies and inter-frequency neighbouring cells that are relevant for cell re-selection. The IE includes cell re-selection parameters common for a frequency as well as cell specific re-selection parameters, i.e. it contains the equivalent threshold parameters as SIB4 in NR. Relevant threshold parameters are q-RxLevMin q-QualMin-r9 p-Max t-ReselectionEUTRA qOffsetFreq threshX-High threshX-Low

The particular system information block referred to as SIB24 contains information that is only relevant for inter-RAT cell re-selection, i.e. information about NR frequencies and NR neighbouring cells relevant for cell re-selection. That is to say, it contains the equivalent threshold parameters as SIB5 in NR. Relevant threshold parameters are t-ReselectionNR-r15 q-RxLevMin-r15 p-MaxNR-r15 q-QualMin-r15 threshX-High-r15 threshX-Low-r15

Having presented relevant parameters, we proceed and describe various scenarios where these parameters are used. To this end we begin by describing mobility management in idle mode, RRC_IDLE. For UEs in RRC_IDLE, the mobility is handled via cell selection/reselection procedures. The UE wakes up only once in every DRX cycle, to monitor the network for paging messages and to make measurements relating to the reference signal received power, RSRP and the reference signal received quality, RSRQ, for the serving cell, and, if deemed necessary, to make measurements on some other target cells in order to be able to decide whether it can still camp on the serving cell or if needs to find a better cell. As briefly explained above, the Network, NW, instructs the UEs on how to quantify the serving and other target cell measurements via broadcasting a set of parameters incorporated in MIB and SIBs. More concretely, for each cell the receiving RSRP level, denoted by Srxlev, and the receiving RSRQ level, denoted by Squal, are computed by using the following formula:

Srxlev=Qrxlevmeas−(Qrxlevmin+Qrxlevminoffset)−Pcompensation−Qoffsettemp

Squal=Qqualmeas−(Qqualmin+Qqualminoffset)−Qoffsettemp, where, Qrxlevmeas and Qqualmeas are the cell RSRP and RSRQ measurements performed by the UE and where the other parameters are provided to the UE via system information. In NR, the serving cell parameters are broadcasted in SIB1, intra-frequency parameters are broadcasted in SIB2, inter-frequency parameters in SIB4 and inter-RAT parameters in SIB5. The table below shows the detailed explanations on Qrxlevmin, Qqualmin, Qrxlevminoffsetcell, and Qqualvminoffsetcell as defined in the technical specification TS 38.304.

| | |
|---|---|
| $S_{rxlev}$ | Cell selection RX level value (dB) |
| $S_{qual}$ | Cell selection quality value (dB) |
| $Q_{offsettemp}$ | Offset temporarily applied to a cell as specified in [3] (dB) |
| $Q_{rxlevmeas}$ | Measured cell RX level value (RSRP) |
| $Q_{qualmeas}$ | Measured cell quality value (RSRQ) |
| $Q_{rxlevminoffset}$ | Offset to the signalled Qrxlevmin taken into account in the Srxlev evaluation as a result of a periodic search for a higher priority PLMN while camped normally in a VPLMN |
| $Q_{qualminoffset}$ | Offset to the signalled Qqualmin taken into account in the Squal evaluation as a result of a periodic search for a higher priority PLMN while camped normally in a VPLMN |
| $P_{compensation}$ | If the UE supports the additionalPmax in the NS-PmaxList, if present, in SIB1: max(Pmax − PPowerClass, 0) − (min(PAdditionalPmax, PPowerClass) − min(Pmax, PPowerClass)) (dB); else: max(Pmax − PPowerClass, 0) (dB) |
| $Q_{rxlevmin}$ | Minimum required RX level in the cell (dBm). Qrxlevmin is obtained from q-RxLevMin in SIB1 SIB1, SIB2 and SIB4 Additionally, if $Q_{rxlevminoffsetcell}$ is present in SIB3, SIB4 and SIB5 for the concerned cell, this cell specific offset is added to the corresponding Qrxlevmin to achieve the required minimum RX level in the concerned cell. |
| $Q_{qualmin}$ | Minimum required quality level in the cell (dB). Additionally, if $Q_{qualminoffsetcell}$ is signalled for the concerned cell, this cell specific offset is added to achieve the required minimum quality level in the concerned cell. |
| $Q_{rxlevminoffsetcell}$ | This specifies the cell specific Rx level offset in dB to Qrxlevmin. In 38.331 this is q-RxLevMinOffsetCell in SIB3, SIB4 and SIB5. |
| $Q_{qualvminoffsetcell}$ | This specifies the cell specific quality level offset in dB to Qqualmin. In 38.331 this is q-QualMinOffsetCell in SIB3, SIB4 and SIB5. |
| $Q_{offset}$ | For intra-frequency: $Q_{offset}$ has a valid value, <>0 dB. $Q_{offset}$ = 0 dB. For equal priority inter-frequency: $Q_{offset}$ + $Q_{offsetfrequency}$, if $Q_{offset}$ has a valid value, <>0 dB. $Q_{offsetfrequency}$. |
| $Q_{hyst}$ | A hysteresis parameter. In order to avoid ping-pong effect when the signal level fluctuate. It is advertised in SIB2. |

The parameters Qrxlevminoffsetcell specify the cell specific Rx level offset and cell specific quality level offset.

Srxlev Cell selection RX level value, in dB.

Squal Cell selection quality value, in dB.

Qoffsettemp Offset temporarily applied to a cell in dB.

Qrxlevmeas Measured cell RX level value, RSRP.

Qqualmeas Measured cell quality value, RSRQ.

Qrxlevminoffset: offset to the signaled Qrxlevmin taken into account the Srxlev evaluation as a result of a periodic search for a higher priority PLMN while camped normally in a VPLMN.

Qqualminoffset: offset to the signaled Qqualmin taken into account in the Squal evaluation as a result of a periodic search for a higher priority PLMN while camped normally in a VPLMN.

Pcompensation: If the UE supports the additionalPmax in the NS-PmaxList in SIB1:

max(P max−PPowerClass,0)−(min(PAdditionalP max,PPowerClass)−min(P max,PPowerClass)) in dB;

in other cases max(P max−PPowerClass,0), in dB

Qrxlevmin Minimum required RX level in the cell in dBm.

Qrxlevmin is obtained from q-RxLevMin in SIB1 SIB1, SIB2 and SIB4 Additionally, if Qrxlevminoffsetcell is present in SIB3, SIB4 and SIB5 for the concerned cell, this cell specific offset is added to the corresponding Qrxlevmin to achieve the required minimum RX level in the concerned cell.

Qqualmin Minimum required quality level in the cell, in dB. Additionally, if Qqualminoffsetcell is signalled for the concerned cell, this cell specific offset is added to achieve the required minimum quality level in the concerned cell.

Qrxlevminoffsetcell This specifies the cell specific Rx level offset in dB to Qrxlevmin. Qqualvminoffsetcell This specifies the cell specific quality level offset in dB to Qqualmin. In technical specification 38.331 this is q-QualMinOffsetCell in SIB3, SIB4 and SIB5.

Qoffset for intra-frequency the Qoffset has a valid value, < >0 dB.

Qoffset=0 dB.

For equal priority inter-frequency:

Qoffset+Qoffsetfrequency, if Qoffset has a valid value, < >0 dB.

Qoffsetfrequency.

Qhyst A hysteresis parameter.

A cell is considered as a suitable cell at a UE to camp on when at least the following cell selection criteria are fulfilled: Srxlev>0; Squal>0.

A UE is required to perform measurements on higher priority inter-frequency and inter-RAT frequencies. UE performs cell reselection to an inter-frequency or inter-RAT frequency cell based on absolute-priority based criteria. For intra-frequency and equal priority inter-frequency cell reselection based on the cell ranking criteria and number of good beams-based criteria defined in TS 38.304. The UE performs the ranking for cells which fulfil the cell selection criteria.

To limit the UE measurements on different target cells, the following rules are applied:
- If the UE measurements for serving cell fulfil Srxlev>SIntraSearchP and Squal>SIntraSearchQ, the UE is not required to measure on any intra-frequency cells.
- If the measurements for serving cell fulfil Srxlev>SnonIntraSearchP and Squal>SnonIntraSearchQ, the UE is not required to measure on any inter-frequency or inter-RAT cells.
- If Srxlev<SIntraSearchP or Squal<SIntraSearchQ, then the UE performs intra-frequency cell measurements and ranking according to TS 38.331, Section 5.2.4.6 and reselects to the highest priority cell if the reselection criteria is fulfilled during a time interval TreselectionRAT. If Srxlev<SnonIntraSearchP or Squal<SnonIntraSearchQ, the UE perform inter-frequency and/or inter-RAT measurements only for cells which are indicated in system information and for which the UE has priority provided, as explained in TS 38.331 Section 5.2.4.2.

We now continue and describe specific cell reselection priorities. In NR, an IDLE or INACTIVE UE camping on a cell may receive via system information, e.g. common for intra/inter-frequency in SIB2 NR, inter-frequency in SIB4 and inter-Rat in SIB5. Absolute priorities of different NR frequencies or inter-RAT frequencies may be provided to the UE in the system information, in the RRCRelease message, or by inheriting from another RAT at inter-RAT cell selection or reselection. In the case of system information, an NR frequency or inter-RAT frequency may be listed without providing a priority, i.e. the field cellReselectionPriority is absent for that frequency.

The IE CellReselectionPriority concerns the absolute priority of the concerned carrier frequency, as used by the cell reselection procedure. Corresponds to parameter "priority" in TS 38.304 [20]. Value 0 means lowest priority. The UE behavior for the case the field is absent, if applicable, is specified in TS 38.304.

CellReselectionPriority Information Element
ASN1START
TAG-CELLRESELECTIONPRIORITY-START
CellReselectionPriority::=INTEGER (0 . . . 7)
TAG-CELLRESELECTIONPRIORITY-STOP
ASN1STOP And, according to TS 38.304, the UE may be configured via system information with a priority indication per frequency (in the same RAT or inter-RAT). First, the UE only performs cell reselection evaluation for NR frequencies and inter-RAT frequencies that are given in system information and for which the UE has a priority provided.

2.1.3.1 Intra Frequency Reselection

If the network is using single carrier frequency, intra frequency reselection shall be performed under the conditions below. The UE is camping on the serving cell as long as the following conditions are met:
- Srxlev>SIntraSearchP, neighbouring measurement RSRP does not fall below the threshold
- Squal>SIntraSearchQ, neighbouring measurement RSRQ does not fall below the threshold.

Where,

SIntraSearchP parameter is a threshold that the serving cell advertises as part of SIB2, s-IntraSearchP IE.

SIntraSearchQ parameter is a threshold that the serving cell advertises as part of SIB2, s-IntraSearchQ IE.

$$Srxlev = Qrxlevmeas - (Qrxlevmin + Qrxlevminoffset) - Pcompensation - Qoffsettemp$$

$$Squal = Qqualmeas - (Qqualmin + Qqualminoffset) - Qoffsettemp$$

When the criterions are not met, the UE switches to the best ranked cell under the following conditions:
- The UE must have been camped on the serving cell for at least 1 second.
- The new cell must be better ranked than the serving cell during a time interval t-ReselectionNR.

The cells that fulfil the cell selection criterion Srxlev>0 and Squal>0, are ranked to Rs for serving cell and Rn for neighbouring cells defined as the following:

$$Rs = Qmeas,s + Qhyst$$

$$Rn = Qmeas,n - Qoffset$$

We now continue and describe Inter Frequency Reselection. If the network is using more than one carrier frequency, the serving cell advertises the other carriers as part of SIB4. If another carrier is involved, the priority of the frequency compared to the serving frequency will be considered.

The UE shall perform measurement for a NR inter-frequency with an equal, higher or lower reselection priority than the reselection priority of the serving NR frequency under the following condition:

$$Srxlev < SnonIntraSearchP \text{ or}$$
$$Squal < SnonIntraSearchQ$$

Where,

SnonIntraSearchP parameter is a threshold that the serving cell advertises as part of SIB2, s-NonIntraSearchP IE.

SnonIntraSearchQ parameter is a threshold that the serving cell advertises as part of SIB2, s-NonIntraSearchQ IE.

Below we will describe the mechanism with reselection to equal priority. The reselection to equal priority NR frequency than the serving cell is based on ranking on intra frequency cell reselection.

Consider first the case with reselection to higher priority. The reselection to higher priority NR frequency than the serving cell is performed under the following conditions:
- The UE must have been camped on the serving cell for at least 1 second.
- The new cell fulfils Squal>ThreshX, HighQ condition during the time interval t-ReselectionNR when thresh-ServingLowQ is already broadcast in SIB2.

The new cell fulfils Srxlev>ThreshX, HighP condition during the time interval t-ReselectionNR when threshServingLowQ is not broadcast in SIB2.

Where,

ThreshServing,LowQ and t-ReselectionNR advertise in SIB2.

ThreshX, HighQ and ThreshX,HighP advertise in SIB4.

Consider now instead a reselection to lower priority. The reselection to lower priority NR frequency than the serving cell is performed when under the following conditions:

The UE must have been camped on the serving cell for at least 1 second.

The new cell fulfils Squal>ThreshX,LowQ condition during the time interval t-ReselectionNR when threshServingLowQ is already broadcast in SIB2 and Squal<ThreshServing, LowQ.

The new cell fulfills Squal>ThreshX,LowP condition during the time interval t-ReselectionNR when threshServingLowQ is already broadcast in SIB2 and Srxlev<ThreshServing, LowP.

Where,

ThreshServing,LowQ, ThreshServing,LowP, t-ReselectionNR advertise in SIB2.

ThreshX,LowQ and ThreshX,LowP advertise in SIB4.

In this case the UE is unable to find a cell with an equal or higher priority NR frequency which can reselect to.

Below we describe Inter RAT Frequency Reselection. The UE shall perform measurement for inter-RAT frequency with higher or lower reselection priority than the reselection priority of the serving NR frequency under the following condition:

$Srxlev < SnonIntraSearchP$ or
$Squal < SnonIntraSearchQ$

Where,

SnonIntraSearchP parameter is a threshold that the serving cell advertises as part of SIB2, s-NonIntraSearchP IE.

SnonIntraSearchQ parameter is a threshold that the serving cell advertises as part of SIB2, s-NonIntraSearchQ IE.

The scenario with reselection to equal priority between RATs are not supported. This means that there is no equal priority between NR frequency in the serving cell and EUTRA frequency in the neighboring cell. The reselection to higher priority EUTRA frequency, that is to say, higher than the serving cell, is performed under the following conditions:

The UE must have been camped on the serving cell for at least 1 second.

The new cell fulfils Squal>ThreshX, HighQ condition during the time interval t-ReselectionEUTRA when threshServingLowQ is already broadcast in SIB2.

The new cell fulfils Srxlev>ThreshX, HighP condition during the time interval t-ReselectionEUTRA when threshServingLowQ is not broadcast in SIB2.

Where,

ThreshServing,LowQ advertises in SIB2.

t-ReselectionEUTRA, ThreshX, HighQ and ThreshX, HighP advertise in SIB5.

The reselection to lower priority EUTRA frequency, i.e., lower than the serving cell, is performed under the following conditions:

The UE must have been camped on the serving cell for at least 1 second.

The new cell fulfills Squal>ThreshX,LowQ condition during the time interval t-ReselectionEUTRA when threshServingLowQ is already broadcast in SIB2 and Squal<ThreshServing,LowQ.

The new cell fulfills Srxlev>ThreshX,LowP condition during the time interval t-ReselectionEUTRA when threshServingLowQ is not broadcast in SIB2 and Srxlev<ThreshServing, LowP.

Where,

ThreshServing,LowQ and ThreshServing,LowP advertise in SIB2.

t-ReselectionEUTRA, ThreshX, LowP and ThreshX, LowQ advertise in SIB5.

In this section we describe the mechanism behind release with redirect. In LTE, release and redirect feature is used to release an RRC_CONNECTED UE to RRC_IDLE and redirect it to another frequency, either in the same RAT or not.

RC Connection Release kind of message can include release cause information, redirect carrier frequency and idle mode mobility control information.

In in LTE, NR and other mobile networks, system information is broadcasted in MIB Master Information Block, MIB and different System Information Blocks, SIBs. The MIB includes a limited number of most essential and most frequently transmitted parameters that are needed to acquire other information from the cell and is transmitted on BCH UEs in idle mode, RRC_IDLE, read system information from the MIB and SIBs in order to know how to move between different cells, i.e. how to perform cell selection/reselection. The parameters that the UE reads are related to e.g. identities of networks and cells, cell barring, signal level thresholds, quality level thresholds, frequency channels and priorities.

In NR the threshold parameters are available in the different SIBs as follows:

SIB1 contains info on whether the UE can access a cell and scheduling info for other SIBs plus RRC config info common for all UEs. The threshold parameters in SIB1 is thus related to the serving cell, under which conditions a UE can camp on it.

Relevant parameters are:

q-RxLevMin specifies the minimum required signal level (RSRP) in the cell.

q-RxLevMinOffset is the offset related to q-RxLevMin, the RSRP threshold. It is optional but used to make better cell selection decisions (it is added serving cell signal level value).

q-QualMin specifies the minimum required quality level, RSRQ level, in the cell.

q-QualMinOffset is the offset related to q-QualMin.

connEstFailOffset is used to configure parameters for connection establishment failure control. In section below, it is called Qoffsettemp.

SIB2 contains cell re-selection information common for intra-frequency, inter-frequency and/or inter-RAT cell re-selection (except for neighboring cell related intra-frequency cell re-selection). Relevant parameters are:

q-Hyst: the signal level for neighboring cells is decreased with the hysteresis value in order to avoid ping-pong.

s-NonIntraSearchP is the threshold Srxlev value for serving cell, determines whether UE should search for new cell or not.

s-NonIntraSearchQ is the threshold Squal value for serving cell, determines whether UE should search for new cell or not.

q-RxLevMin is the minimum signal level for neighbor cell.

q-QualMin specifies the minimum required quality level in the cell in dB for intra-frequency neighbor cells.

s-IntraSearchP indicates an Rx level threshold, the UE performs intra-frequency measurement only when Srx-Lev of the serving cell<=SintraSearch.

s-IntraSearchQ indicates a Qual level threshold, the UE performs intra-frequency measurement only when Squal of the serving cell<=SintraSearchQ.

t-ReselectionNR is the time the threshold condition needs to be fulfilled in order before a reselection can be done.

p-Max is the maximal power from a UE and is used to calculate Pcompensation used in section below.

threshServingLowP is the Srlev threshold (in dB) used by the UE on the serving cell when reselecting towards a lower priority RAT/frequency (ThreshServing,LowP in 38.304)

threshServingLowQ is the Squal threshold used by the UE on the serving cell when reselecting towards a lower priority RAT/frequency (ThreshServing,LowQ in 38.304)

SIB3 contains information relevant only for intra-frequency cell-reselection. Relevant threshold parameters are:

intraFreqNeighCellList, a list of size (1 . . . maxCellIntra) of intra-frequency neighbouring cells with specific cell reselection parameters:

physCellId denotes the Physical Cell Id of the neighbour cell q-OffsetCell (Qoffsets,n in 38.304) denotes the specific Rx offset between the serving cell and the neighbor cell q-RxLevMinOffsetCell (Qrxlevminoffsetcell in 38.304) denotes the cell specific Rx level offset in dB to Qrxlevmin q-QualMinOffsetCell (Qqualminoffsetcell in 38.304) denotes the cell specific quality level offset in dB to Qqualmin SIB4 contains information relevant only for inter-frequency cell re-selection. This means that each set of parameters are available for each neighbor frequency band. Relevant threshold parameters are:

q-RxLevMin denotes the minimum signal level for the neighbor cell.

q-QualMin denotes the minimum quality level for the neighbor cell.

p-Max is the maximal power from a UE and is used to calculate Pcompensation used in section below.

t-ReselectionNR denotes the time interval that evaluate the re-selection criteria before the reselection can be done.

qOffsetFreq denotes offset for equal priority NR frequencies.

q-RxLevMinOffsetCell denotes the cell specific Rx level offset in dB to q-RxLevMin threshX-HighP denotes the Srxlev threshold (in dB) used by the UE when reselecting towards a higher priority frequency than the current serving frequency. Each frequency of NR might have a specific threshold.

threshX-LowP denotes the Srxlev threshold (in dB) used by the UE when reselecting towards a lower priority frequency than the current serving frequency. Each frequency of NR might have a specific threshold.

SIB5 contains information relevant only for inter-RAT cell re-selection information about E-UTRA frequencies and neighboring cells. The threshold levels in SIB5 are unique for each E-UTRA frequency. The relevant parameters are:

t-ReselectionEUTRA
q-RxLevMin
q-QualMin p-MaxEUTRA is the maximal power from a UE and is used to calculate Pcompensation used in section below.

q-RxLevMinOffsetCell denotes the cell specific Rx level offset in dB to q-RxLevMin threshX-HighP denotes the Srxlev threshold (in dB) used by the UE when reselecting towards a higher priority RAT than the current serving frequency. Each frequency of E-UTRAN might have a specific threshold.

threshX-LowP denotes the Srxlev threshold (in dB) used by the UE when reselecting towards a lower priority RAT than the current serving frequency. Each frequency of E-UTRAN might have a specific threshold.

In LTE the equivalent parameters are arranged in SIBs in similar way. Here it is the parameters in SIB1, SIB3, SIB5 and SIB24 that is of interest.

SIB1 contains information relevant when evaluating if a UE is allowed to access a cell and defines the scheduling of other system information (i.e. it contains the equivalent threshold parameters as SIB1 in NR). Relevant threshold parameters are q-RxLevMin
q-RxLevMinOffset
p-Max
q-QualMin-r9
q-QualMinOffset-r9

SIB3 contains cell re-selection information common for intra-frequency, inter-frequency and/or inter-RAT cell re-selection (i.e. applicable for more than one type of cell re-selection but not necessarily all) as well as intra-frequency cell re-selection information other than neighbouring cell related (i.e. it contains the equivalent threshold parameters as SIB2 in NR). Relevant threshold parameters are q-Hyst
s-NonIntraSearch/s-NonIntraSearchP-r9
s-NonIntraSearchQ-r9
q-RxLevMin
q-QualMin-r9
s-IntraSearch/s-IntraSerachP-r9
s-IntraSearchQ-r9
t-ReselectionEUTRA
p-Max
threshServingLow SIB5 contains information relevant only for inter-frequency cell re-selection i.e. information about other E UTRA frequencies and inter-frequency neighbouring cells relevant for cell re-selection. The IE includes cell re-selection parameters common for a frequency as well as cell specific re-selection parameters (i.e. it contains the equivalent threshold parameters as SIB4 in NR). Relevant threshold parameters are q-RxLevMin
q-QualMin-r9
p-Max
t-ReselectionEUTRA
qOffsetFreq
threshX-High
threshX-Low SIB24 contains information relevant only for inter-RAT cell re-selection i.e. information about NR frequencies and NR neighbouring cells relevant for cell re-selection (i.e. it contains the equivalent threshold parameters as SIB5 in NR). Relevant threshold parameters are t-ReselectionNR-r15
q-RxLevMin-r15
p-MaxNR-r15
q-QualMin-r15 threshX-High-r15
threshX-Low-r15

For UEs in RRC_IDLE, the mobility is handled via cell selection/reselection procedures. In particular, UE wakes up only once in every DRX cycle, to monitor the network for paging messages and to make the reference signal received power (RSRP)/the reference signal received quality (RSRQ) measurements for the serving cell, and if necessary some other target cells to decide if it can still camp on the serving cell or if needs to find a better cell.

As briefly explained above, NW instructs the UEs on how to quantify the serving and other target cell measurements via broadcasting a set of parameters broadcasted in MIB and SIBs. More precisely, for each cell the receiving RSRP level, denoted by Srxlev, and the receiving RSRQ level, denoted by Squal, are computed using the following formula:

$$Srxlev = Qrxlevmeas - (Qrxlevmin + Qrxlevminoffset) - Pcompensation - Qoffsettemp$$

$$Squal = Qqualmeas - (Qqualmin + Qqualminoffset) - Qoffsettemp$$

Where, Qrxlevmeas and Qqualmeas are cell RSRP and RSRQ measurements by UE respectively and other parameters are provided to the UE via system information. In NR, serving cell parameters are broadcasted in SIB1, intra-frequency parameters are broadcasted in SIB2, inter-frequency parameters in SIB4 and inter-RAT parameters in SIB5.

A table below shows the detailed explanations on Qrxlevmin, Qqualmin, Qrxlevminoffsetcell, and Qqualvminoffsetcell defined in TS 38.304. The parameters Qrxlevminoffsetcell and Qqualvminoffsetcell which are introduced in Rel-15 specify the cell specific Rx level offset and cell specific quality level offset.

Srxlev Cell selection RX level value (dB)
Squal Cell selection quality value (dB)
Qoffsettemp Offset temporarily applied to a cell as specified in [3] (dB)
Qrxlevmeas Measured cell RX level value (RSRP)
Qqualmeas Measured cell quality value (RSRQ)
Qrxlevminoffset Offset to the signalled Qrxlevmin taken into account in the Srxlev evaluation as a result of a periodic search for a higher priority PLMN while camped normally in a VPLMN
Qqualminoffset Offset to the signalled Qqualmin taken into account in the Squal evaluation as a result of a periodic search for a higher priority PLMN while camped normally in a VPLMN
Pcompensation If the UE supports the additionalPmax in the NS-PmaxList, if present, in SIB1:

$$\max(P\,max - PPowerClass, 0) - (\min(PAdditionalP\,max, PPowerClass) - \min(P\,max, PPowerClass))$$
(dB);

else:

$$\max(P\,max - PPowerClass, 0)\,(dB)$$

Qrxlevmin Minimum required RX level in the cell (dBm).
Qrxlevmin is obtained from q-RxLevMin in SIB1 SIB1, SIB2 and SIB4 Additionally, if Qrxlevminoffsetcell is present in SIB3, SIB4 and SIB5 for the concerned cell, this cell specific offset is added to the corresponding Qrxlevmin to achieve the required minimum RX level in the concerned cell.
Qqualmin Minimum required quality level in the cell (dB). Additionally, if Qqualminoffsetcell is signalled for the concerned cell, this cell specific offset is added to achieve the required minimum quality level in the concerned cell.
Qrxlevminoffsetcell This specifies the cell specific Rx level offset in dB to Qrxlevmin. In 38.331 this is q-RxLevMinOffsetCell in SIB3, SIB4 and SIB5.
Qqualvminoffsetcell This specifies the cell specific quality level offset in dB to Qqualmin. In 38.331 this is q-QualMinOffsetCell in SIB3, SIB4 and SIB5.
Qoffset For intra-frequency:
Qoffset has a valid value, <>0 dB.
Qoffset=0 dB.
For equal priority inter-frequency:
Qoffset+Qoffsetfrequency, if Qoffset has a valid value, <>0 dB.
Qoffsetfrequency.
Qhyst A hysteresis parameter.

In order to avoid ping-pong effect when the signal level fluctuate. It is advertised in SIB2.

A cell is considered as a suitable cell at a UE to camp on when at least the following cell selection criteria are fulfilled: Srxlev>0; Squal>0.

UE is required to perform measurements on higher priority inter-frequency and inter-RAT frequencies. UE performs cell reselection to an inter-frequency or inter-RAT frequency cell based on absolute-priority based criteria. For intra-frequency and equal priority inter-frequency cell reselection based on the cell ranking criteria and number of good beams-based criteria defined in TS 38.304. The UE performs the ranking for cells which fulfil the cell selection criteria.

To limit UE measurement on different target cells, we have the following rules:
 If the UE measurements for serving cell fulfil Srxlev>SIntraSearchP and Squal>SIntraSearchQ, the UE is not required to measure on any intra-frequency cells.
 If the measurements for serving cell fulfil Srxlev>SnonIntraSearchP and Squal>SnonIntraSearchQ, the UE is not required to measure on any inter-frequency or inter-RAT cells.
 If Srxlev<SIntraSearchP or Squal<SIntraSearchQ, then the UE performs intra-frequency cell measurements and ranking according to TS 38.331 Section 5.2.4.6 and reselects to the highest priority cell if the reselection criteria is fulfilled during a time interval TreselectionRAT. If Srxlev<SnonIntraSearchP or Squal<SnonIntraSearchQ, the UE perform inter-frequency and/or inter-RAT measurements only for cells which are indicated in system information and for which the UE has priority provided, as explained in TS 38.331 Section 5.2.4.2.

In NR, an IDLE or INACTIVE UE camping on a cell may receive via system information (e.g. common for intra/inter-frequency in SIB2 NR, inter-frequency in SIB4 and inter-Rat in SIB5). Absolute priorities of different NR frequencies or inter-RAT frequencies may be provided to the UE in the system information, in the RRCRelease message, or by inheriting from another RAT at inter-RAT cell (re)selection. In the case of system information, an NR frequency or inter-RAT frequency may be listed without providing a priority (i.e. the field cellReselectionPriority is absent for that frequency).

CellReselectionPriority

The IE CellReselectionPriority concerns the absolute priority of the concerned carrier frequency, as used by the cell reselection procedure. Corresponds to parameter "priority" in TS 38.304 [20]. Value 0 means lowest priority. The UE behaviour for the case the field is absent, if applicable, is specified in TS 38.304.

CellReselectionPriority Information Element
ASN1START
TAG-CELLRESELECTIONPRIORITY-START
CellReselectionPriority::=INTEGER (0 ... 7)
TAG-CELLRESELECTIONPRIORITY-STOP
ASN1 STOP The UE may be configured via system information with a priority indication per frequency, in the same RAT or inter-RAT. First, the UE only performs cell reselection evaluation for NR frequencies and inter-RAT frequencies that are given in system information and for which the UE has a priority provided.

If the network is using single carrier frequency, intra frequency reselection shall be performed under the conditions below. The UE is camping on the serving cell as long as the following conditions are met:
Srxlev>SIntraSearchP, neighbouring measurement RSRP does not fall below the threshold)
Squal>SIntraSearchQ, neighbouring measurement RSRQ does not fall below the threshold).
Where,
SIntraSearchP parameter is a threshold that the serving cell advertises as part of SIB2, s-IntraSearchP IE.
SIntraSearchQ parameter is a threshold that the serving cell advertises as part of SIB2, s-IntraSearchQ IE.

$$Srxlev=Qrxlevmeas-(Qrxlevmin+Qrxlevminoffset)-Pcompensation-Qoffsettemp$$

$$Squal=Qqualmeas-(Qqualmin+Qqualminoffset)-Qoffsettemp$$

When the criterions are not met, the UE switches to the best ranked cell under the following conditions:
The UE must have been camped on the serving cell for at least 1 second.
The new cell must be better ranked than the serving cell during a time interval t-ReselectionNR.
The cells that fulfil the cell selection criterion Srxlev>0 and Squal>0, are ranked to Rs for serving cell and Rn for neighbouring cells defined as the following:

$$Rs=Qmeas,s+Qhyst$$

$$Rn=Qmeas,n-Qoffset$$

If the network is using more than one carrier frequency, the serving cell advertises the other carriers as part of SIB4. If another carrier is involved, the priority of the frequency compared to the serving frequency will be considered.

The UE shall perform measurement for a NR inter-frequency with an equal, higher or lower reselection priority than the reselection priority of the serving NR frequency under the following condition:

$$Srxlev<SnonIntraSearchP \text{ or }$$
$$Squal<SnonIntraSearchQ$$

Where,
SnonIntraSearchP parameter is a threshold that the serving cell advertises as part of SIB2, s-NonIntraSearchP IE.
SnonIntraSearchQ parameter is a threshold that the serving cell advertises as part of SIB2, s-NonIntraSearchQ IE.
The reselection to equal priority NR frequency than the serving cell is based on ranking on intra frequency cell reselection.

The reselection to higher priority NR frequency than the serving cell is performed under the following conditions:
The UE must have been camped on the serving cell for at least 1 second.
The new cell fulfils Squal>ThreshX, HighQ condition during the time interval t-ReselectionNR when thresh-ServingLowQ is already broadcast in SIB2.
The new cell fulfils Srxlev>ThreshX, HighP condition during the time interval t-ReselectionNR when thresh-ServingLowQ is not broadcast in SIB2.
Where,
ThreshServing,LowQ and t-ReselectionNR advertise in SIB2.
ThreshX, HighQ and ThreshX,HighP advertise in SIB4.
The reselection to lower priority NR frequency than the serving cell is performed when under the following conditions:
The UE must have been camped on the serving cell for at least 1 second.
The new cell fulfills Squal>ThreshX,LowQ condition during the time interval t-ReselectionNR when thresh-ServingLowQ is already broadcast in SIB2 and Squal<ThreshServing, LowQ.
The new cell fulfills Squal>ThreshX,LowP condition during the time interval t-ReselectionNR when threshServingLowQ is already broadcast in SIB2 and Srxlev<ThreshServing, LowP.
Where,
ThreshServing,LowQ, ThreshServing,LowP, t-ReselectionNR advertise in SIB2.
ThreshX,LowQ and ThreshX,LowP advertise in SIB4.
In this case the UE is unable to find a cell with an equal or higher priority NR frequency which can reselect to.

The UE shall perform measurement for inter-RAT frequency with higher or lower reselection priority than the reselection priority of the serving NR frequency under the following condition:

$$Srxlev<SnonIntraSearchP \text{ or }$$
$$Squal<SnonIntraSearchQ$$

Where,
SnonIntraSearchP parameter is a threshold that the serving cell advertises as part of SIB2, s-NonIntraSearchP IE.
SnonIntraSearchQ parameter is a threshold that the serving cell advertises as part of SIB2, s-NonIntraSearchQ IE.
The equal priority between RATs are not supported. This means that there is no equal priority between NR frequency in the serving cell and EUTRA frequency in the neighboring cell.

The reselection to higher priority EUTRA frequency than the serving cell is performed under the following conditions:
The UE must have been camped on the serving cell for at least 1 second.
The new cell fulfills Squal>ThreshX, HighQ condition during the time interval t-ReselectionEUTRA when threshServingLowQ is already broadcast in SIB2.
The new cell fulfills Srxlev>ThreshX, HighP condition during the time interval t-ReselectionEUTRA when threshServingLowQ is not broadcast in SIB2.
Where,
ThreshServing,LowQ advertises in SIB2.
t-ReselectionEUTRA, ThreshX, HighQ and ThreshX, HighP advertise in SIB5.

The reselection to lower priority EUTRA frequency than the serving cell is performed under the following conditions:

The UE must have been camped on the serving cell for at least 1 second.

The new cell fulfills Squal>ThreshX,LowQ condition during the time interval t-ReselectionEUTRA when threshServingLowQ is already broadcast in SIB2 and Squal<ThreshServing, LowQ.

The new cell fulfills Srxlev>ThreshX,LowP condition during the time interval t-ReselectionEUTRA when threshServingLowQ is not broadcast in SIB2 and Srxlev<ThreshServing, LowP.

Where,

ThreshServing,LowQ and ThreshServing,LowP advertise in SIB2.

t-ReselectionEUTRA, ThreshX, LowP and ThreshX, LowQ advertise in SIB5.

Release with redirection to an NR frequency for an incoming UE in RRC_INACTIVE Latency in release and redirect can be shorter compared to the case UE comes from RRC_IDLE, since security is already activated. Upon sending a secure RRCRelease message the network may either move the UE to RRC_IDLE or RRC_INACTIVE. As the network redirects the UE to another NR frequency, in a typical case the network moves the UE to RRC_INACTIVE, to also speed up the resume of the connection in the target frequency, further reducing the overall latency, as shown below:

As it is shown above, latency can be improved if an RRC_INACTIVE UE tries to resume an RRC connection and, after entering RRC_CONNECTED the UE is suspended to RRC_INACTIVE with redirection information to an NR frequency. At the target cell, the UE tries to resume the connection Delay in this case is 2*RTT_nr (RRCResumeRequest, RRCResume, RRCResumeComplete, RRCRelease)+RTT_Xn (network delay in source from context fetching)+RTT_5 gc (signalling between CN and source path switch)+1.5*RTT_nr (RRCResumeRequest, RRCResume, RRCResumeComplete)+RTT_Xn (network delay in target from context fetching)+RTT_5 gc (signalling between CN and source path switch)=3.5*RTT_nr+2*RTT_Xn+2*RTT_5 gc.

However, there was a performance concern in terms of latency for incoming UEs trying to resume or setup a connection that want to access a particular service not supported in a target cell (e.g. VoIP, video call, etc.). In the case of an RRC_IDLE UE, the UE would need to trigger an RRC establishment procedure, enter RRC_CONNECTED, perform initial security activation, and only then receive the protected redirection information. That would also involve some core network signaling, as shown below:

The problem this invention addresses relates to the latency of existing release with redirect procedure.

In the 2-step release and redirect, with context relocation, an RRC_INACTIVE UE tries to resume an RRC connection and without entering RRC_CONNECTED the UE is suspended to RRC_INACTIVE with redirection information to an NR frequency. At the target cell, the UE tries to resume the connection.

Compared to the baseline case where the UE first enters RRC_CONNECTED to then be released, 2 messages between UE and the target can be skipped (RRCResume and RRCResumeComplete).

Delay in 2-step case with context relocation is RTT_nr (RRCResumeRequest, RRCRelease)+RTT_Xn (network delay in source from context fetching)+RTT_5 gc (signalling between CN and source path switch)+1.5*RTT_nr (RRCResumeRequest, RRCResume, RRCResumeComplete)+RTT_Xn (network delay in target from context fetching)+RTT_5 gc (signalling between CN and source path switch)=2.5*RTT_nr+3*RTT_Xn+2*RTT_5 gc.

The invention claimed is:

1. A method, performed by a User Equipment, UE, in a wireless communication network, the method comprising:
   acquiring broadcasted system information comprising redirection information; and
   performing one of a cell selection and cell reselection procedure based on the acquired broadcasted information, the performing the one of the cell selection and the cell reselection procedure being initiated during a connection resume procedure, where the UE is in an inactive state.

2. The method according to claim 1, wherein the one of the cell selection and the cell reselection procedure is performed based on a pre-determined criterion to be fulfilled according to the redirection information.

3. The method according to claim 2, wherein the predetermined criterion to be fulfilled comprises one or more of:
   that the resume cause for a possible connection resume procedure is comprised in the redirection information; and
   that the access category for a possible connection resume procedure is comprised in the redirection information.

4. The method according to claim 3, wherein the acquired broadcasted information further comprises a mapping between one or more of the resume cause and the access category and at least one of the following:
   a redirection to a target Radio Access Technology, target RAT;
   a redirection to a target serving cell; and
   a redirection to a target frequency.

5. The method according to claim 1, wherein the redirection information is comprised in a broadcasted System Information Block, SIB.

6. The method according to claim 5, wherein the redirection information is comprised in an information element added to an existing SIB.

7. A method performed by a network node serving a User Equipment, UE, in a wireless communication network, the method comprising:
   broadcasting system information comprising redirection information enabling the UE to perform a cell selection or cell reselection procedure during a connection resume procedure, where the UE is in an inactive state; and
   the redirection information comprising at least one of the following:
      a resume cause for a possible connection resume procedure for the UE; and
      an access category for a possible connection resume procedure for the UE.

8. The method according to claim 7, wherein the redirection information further comprises a mapping between one or more of the resume cause, the establishment cause and the access categories and at least one of the following:
   a redirection to a target Radio Access Technology, target RAT;
   a redirection to a target serving cell; and
   a redirection to a target frequency.

9. The method according to claim 7, wherein broadcasting information comprises broadcasting a System Information Block, SIB comprising the redirection information.

10. A User Equipment, UE, in a wireless communication system, the UE comprising:
communication circuitry configured to acquire broadcasted system information comprising redirection information; and
processing circuitry configured to perform one of a cell selection and a cell reselection procedure based on the acquired broadcasted information, the processing circuitry being configured to initiate the one of the cell selection and the cell reselection procedure during a connection resume procedure, where the UE is in an inactive state.

11. The User Equipment, UE, according to claim 10, wherein the processing circuitry is configured to perform the one of the cell selection and the cell reselection procedure based on a pre-determined criterion to be fulfilled by the redirection information.

12. The User Equipment, UE, according to claim 11, wherein the processing circuitry is configured to perform the one of the cell selection and the cell reselection procedure based on at least one of:

if the resume cause for a possible connection resume procedure is comprised in the redirection information; and
if the access category for a possible connection resume procedure is comprised in the redirection information.

13. The User Equipment, UE, according to claim 10, wherein the communication circuitry is configured to acquire broadcasted information that further comprises a mapping between one or more of the resume cause and the access category and at least one of the following:
a redirection to a target Radio Access Technology, target RAT;
a redirection to a target serving cell; and
a redirection to a target frequency.

14. The User Equipment, UE, according to claim 10, wherein the communication circuitry is configured to acquire redirection information comprised in a broadcasted System Information Block, SIB.

15. The User Equipment, UE, according to claim 10, wherein the redirection information is comprised in an information element added to an existing SIB.

* * * * *